(12) United States Patent
Lindoff et al.

(10) Patent No.: US 10,439,859 B2
(45) Date of Patent: Oct. 8, 2019

(54) SYNCHRONIZATION IN MIXED OFDM SUB-CARRIER SPACING SCENARIOS

(71) Applicant: Telefonaktiebolaget LM Ericsson (publ), Stockholm (SE)

(72) Inventors: Bengt Lindoff, Bjarred (SE); Magnus Astrom, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/572,214

(22) PCT Filed: Oct. 28, 2016

(86) PCT No.: PCT/EP2016/076022
§ 371 (c)(1),
(2) Date: Nov. 7, 2017

(87) PCT Pub. No.: WO2018/077415
PCT Pub. Date: May 3, 2018

(65) Prior Publication Data
US 2018/0295009 A1 Oct. 11, 2018

(51) Int. Cl.
*H04L 27/26* (2006.01)
*H04W 52/02* (2009.01)
*H04W 56/00* (2009.01)

(52) U.S. Cl.
CPC ..... *H04L 27/2663* (2013.01); *H04W 52/0203* (2013.01); *H04W 56/001* (2013.01);
(Continued)

(58) Field of Classification Search
CPC ... H04W 72/0406; H04B 7/024; H04L 5/0035
See application file for complete search history.

(56) References Cited

U.S. PATENT DOCUMENTS

2009/0202010 A1 8/2009 Fu et al.
2013/0003897 A1* 1/2013 Kim .................. H04L 27/2607
375/340
(Continued)

FOREIGN PATENT DOCUMENTS

EP 0971515 A2 1/2000
EP 2911321 A1 8/2015
WO 2010013959 A2 2/2010

OTHER PUBLICATIONS

PCT International Search Report, dated Jul. 7, 2017, in connection with International Application No. PCT/EP2016/076022, all pages.
(Continued)

*Primary Examiner* — Ross Varndell
(74) *Attorney, Agent, or Firm* — Leffler Intellectual Property Law, PLLC

(57) ABSTRACT

A wireless communication device receives OFDM radio signals having different numerologies (i.e. different sub-carrier spacing) and determines whether the transmission, by one or more transmitting nodes, of the OFDM signals are coordinated. The meaning of "coordinated" is to be understood as the OFDM signals are time-synchronized and the determination of whether the OFDM signals are coordinated may involve such actions as reading broadcast or receiving configuration message transmitted in the system, determining a relation (for instance cell/access point beam identity) between transmitted synchronization or reference signals. If the OFDM signals are determined to be coordinated, time and/or frequency offset for the second OFDM signal having the second subcarrier spacing is derived based on the time and/or frequency offset associated with the first OFDM signal having the first subcarrier spacing.

23 Claims, 4 Drawing Sheets

(52) U.S. Cl.
CPC .......... *Y02D 70/00* (2018.01); *Y02D 70/1262* (2018.01); *Y02D 70/142* (2018.01); *Y02D 70/21* (2018.01)

(56) References Cited

U.S. PATENT DOCUMENTS

2017/0093538 A1* 3/2017 Yoon .................... H04B 7/0626
2017/0339697 A1* 11/2017 Park ..................... H04L 5/0044

OTHER PUBLICATIONS

PCT Written Opinion, dated Jul. 7, 2017, in connection with International Application No. PCT/EP2016/076022, all pages.
3GPP TSG RAN WG1 Meeting #68, R1-120611, Dresden, Germany Feb. 6-10, 2012, Frequency and Time synchronization aspects of additional carrier type, Intel Corporation, 6 pages.

* cited by examiner

SYNCHRONIZATION IN MIXED OFDM SUB-CARRIER SPACING SCENARIOS

TECHNICAL FIELD

Embodiments herein relate to handling time offsets and frequency offsets relating to orthogonal frequency division multiplexed (OFDM) radio signals in an OFDM wireless communication system where a first subcarrier spacing is utilized together with a second subcarrier spacing.

BACKGROUND

Wireless communication systems that provide communication services to wireless communication devices (often denoted by UE, which is short for user equipment) such as mobile phones, smartphones etc., have evolved during the last decade into systems that must meet an ever increasing demand for high speed data communication capabilities in terms of, e.g., bitrate and to provide these capabilities at any given time and at any geographical location.

The evolution of the systems has followed a sequence of "generations", from first generation analog systems and second generation (2G) digital systems that were mainly focused on providing circuit switched voice services, via third generation (3G) systems that were capable of also providing moderately high data rate packet switched services, to the current fourth generation (4G) systems in which all services are provided in terms of packet data services. A widespread 4G standard is the third generation partnership project (3GPP) long term evolution (LTE), according to which information is communicated in the form of stream of symbols encoded by amplitude and phase of radio frequency (RF) signals distributed over a plurality of sub-carrier frequencies, i.e. according to an orthogonal frequency division multiplex (OFDM) standard.

The work of defining a fifth generation (5G) wireless communication standard is very comprehensive and a future 5G standard should support a variety of different use cases such as mobile broadband (MBB) with massive multiple input-multiple output (MIMO) radio link support, low latency, high reliability communication, low cost machine type communication (MTC) as well as supporting frequency bands spanning from sub GHz to 50+ GHz. In order to be able to support such use cases, the current work within 3GPP includes proposals to enable—within a system bandwidth—a mix of different OFDM sub-carrier spacings (i.e. having different OFDM symbol lengths, and thereby different sampling rates). For example, sub-carrier spacing of 15 kHz*$2^n$, for a limited set of n will be supported, such as 15 kHz and 60 kHz. Furthermore, in order to optimize communication, it is also on the agenda to separate the control plane (for instance mobility management) from the data plane, in the sense that some of the control data may be transmitted from a first network (NW) node (for instance having wide area coverage) while the data may be transmitted from another NW node (for instance, indoor hotspot coverage). Furthermore, it may be possible that the control plane, supporting large (macro) cells may have one sub-carrier spacing (e.g. 15 kHz) and, while data (for low latency applications) may be transmitted with a larger sub-carrier spacing (e.g. 60 kHz), and thereby shorter OFDM symbols enabling lower latency.

Since a carrier frequency generated in a wireless communication device is generated by a low cost local oscillator, the carrier frequency (and thereby also the timing) may drift in relation to the (typically more stable) NW node with which the wireless communication device communicates. Therefore, the wireless communication device needs to continuously monitor frequency and/or timing (f/t) synchronization with respect to the serving NW node. Furthermore, in case of mixed numerologies of the sub-carrier spacing, a wireless communication device supporting 5G needs to keep track (in terms of f/t-synchronization) of all different sub-carrier spacing of signals with possible data intended for the wireless communication device. That is, referring to the 5G example above, the wireless communication device needs to keep track of sub-carrier spacing 15 kHz for the mobility management information and 60 kHz sub-carrier spacing for the data packets.

Furthermore, in a more general aspect, the NW nodes transmitting data to the wireless communication device may be transparent from the point of view of the wireless communication device, and hence the wireless communication device does not necessarily know whether the 15 kHz and 60 kHz numerologies are transmitted from the same NW node or not. Applying prior art techniques for fit synchronization means that the wireless communication device always has two independent synchronization procedures, one for respective numerology. This may entail unnecessary high power consumption.

SUMMARY

In view of the above, an object of the present disclosure is to overcome drawbacks related to time and/or frequency synchronization in an OFDM wireless communication system involving OFDM signals with mixed sub-carrier spacing.

This object is achieved by a method performed by a wireless communication device in an OFDM wireless communication system. The method is for determining a first offset parameter and a second offset parameter associated with a respective received first and second OFDM signal having a respective first and second subcarrier frequency spacing, The method comprises determining whether transmission of the first OFDM signal is coordinated with transmission of the second OFDM signal. If it is determined that the transmission of the first OFDM signal is coordinated with transmission of the second OFDM signal, then a determination is made of the first offset parameter based on the first OFDM signal, and the second offset parameter is determined based on the first offset parameter.

In other words, in a scenario where the wireless communication device receives OFDM radio signals having different numerologies (i.e. different sub-carrier spacing), the wireless communication device determines whether the transmission, by one or more transmitting nodes in the system, of the OFDM signals are coordinated. The meaning of "coordinated" is to be understood as the OFDM signals are time-synchronized, e.g. within the cyclic prefix (CP) and the determination of whether the OFDM signals are coordinated may involve such actions as reading broadcast or receiving configuration message transmitted in the system, determining a relation (for instance cell/access point beam identity) between transmitted synchronization or reference signals. If the OFDM signals are determined to be coordinated, time and/or frequency offset for the second OFDM signal having the second subcarrier spacing is derived based on the time and/or frequency offset associated with the first OFDM signal having the first subcarrier spacing.

Such a method provides an advantage in that, for example, the wireless communication device is enabled to handle synchronization of signals having different subcarrier spacing in a very efficient way, thereby saving power and reduce complexity of the baseband processing. That is, since receiver circuitry must be switched on when sync signals are transmitted even if data is not transmitted at that time, drawbacks (e.g. excessive power consumption) of having to operate separate simultaneous synchronization procedures are at least mitigated.

In some more detail, in embodiments where the first offset parameter is a first time-offset and the second offset parameter is a second time-offset, the determining of the first time-offset may comprise receiving a synchronization signal and calculating a first maximum comparison metric by correlating data of a first plurality of time-shifted versions of the synchronization signal with a known synchronization data sequence. The first time-offset is then identified with a time-shift that corresponds to the first maximum comparison metric.

In embodiments where the first subcarrier spacing is a first factor greater than the second subcarrier spacing, the determination of the second time-offset based on the first time-offset may comprise dividing the first time offset value by the first factor and identifying the second time-offset identified with the result of the division of the first time offset value by the first factor.

In other embodiments, where the first subcarrier spacing is a second factor smaller than the second subcarrier spacing, the determination of the second time-offset based on the first time-offset may comprise multiplying the first time offset value by the second factor, resulting in an approximate second time offset value. In some of these embodiments, the second time-offset is identified with the approximate second time offset. In other embodiments, a second maximum comparison metric is then calculated by correlating data of a second plurality of time-shifted versions of the synchronization signal with a known synchronization data sequence. The second plurality of time-shifted versions of the synchronization signal is smaller than the first plurality of time-shifted versions of the synchronization signal and the second plurality of time shifted versions of the synchronization signal comprises the approximate second time offset value. The second time-offset is then identified with a time-shift that corresponds to the second maximum comparison metric.

Some embodiments, where the first offset parameter is a first frequency-offset and the second offset parameter is a second frequency-offset, comprise obtaining, from the first OFDM signal, a first reference symbol and a second reference symbol. Based on the first reference symbol and based on the second reference symbol, a determination is made of a radio channel rotation value. The first frequency-offset is then determined based on the channel rotation value and the second frequency offset is calculated by multiplying the first frequency offset with a factor that is the quotient between a carrier frequency of the second OFDM signal and a carrier frequency of the first OFDM signal.

With regard to the determination whether transmission of the first OFDM signal is coordinated with transmission of the second OFDM signal, it may in some embodiments comprise determining that transmission of the first OFDM signal and the second OFDM signal is controlled by one and the same node in the wireless communication network. This determination that transmission of the first OFDM signal and the second OFDM signal is controlled by one and the same node may for example comprise receiving a configuration message transmitted from a node with which the wireless communication device is associated in the wireless communication system. In other embodiments, this the determination that transmission of the first OFDM signal and the second OFDM signal is controlled by one and the same node may comprise any of: analysing synchronization signals comprised in at least one of the first and second OFDM signals, analysing cell identity information comprised in at least one of the first and second OFDM signals, analysing beam identity information comprised in at least one of the first and second OFDM signals, and analysing access point identity information comprised in at least one of the first and second OFDM signals.

In other embodiments, the determining whether transmission of the first OFDM signal is coordinated with transmission of the second OFDM signal may comprise receiving a message, the message comprising information that specifies that transmission of the first OFDM signal is coordinated with transmission of the second OFDM signal. For example, the received message may be a broadcast message transmitted in the wireless communication system.

In a second aspect there is provided a wireless communication device for an OFDM wireless communication system. The wireless communication device is for determining a first offset parameter and a second offset parameter associated with a respective received first OFDM signal and second OFDM signal having a respective first and second subcarrier frequency spacing. The wireless communication device comprises input/output circuitry, a processor and a memory. The memory contains instructions executable by the processor whereby the wireless communication device is operative to:

determine whether transmission of the first OFDM signal is coordinated with transmission of the second OFDM signal,
 if it is determined that the transmission of the first OFDM signal is coordinated with transmission of the second OFDM signal, then
  determine the first offset parameter based on the first OFDM signal, and
  determine the second offset parameter based on the first offset parameter.

In another aspect there is provided a computer program, comprising instructions which, when executed on at least one processor in a wireless communication device, cause the wireless communication device to carry out the method as summarized above in connection with the first aspect and the various embodiments of this aspect, In yet another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

DETAILED DESCRIPTION

Embodiments of the present disclosure may be implemented in one or more wireless communications system.

Figure 1A:
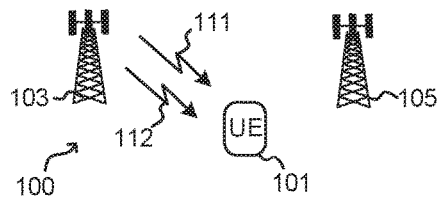
FIGS. 1a and 1b schematically illustrate a wireless communication system.
Figure 1B:
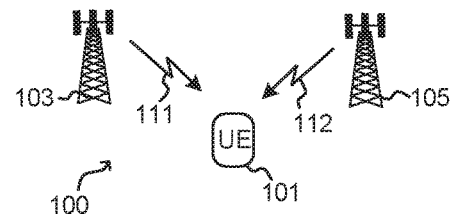

FIG. 1a and FIG. 1b depict, very schematically, such a wireless communications system 100. The wireless communications system 100 may for example be any 3GPP system, including LTE systems, or any other wireless communication system that make use of OFDM, including 5G systems.

The wireless communications system 100 may comprise a plurality of base stations and/or other network nodes. As exemplified in FIGS. 1a and 1b, the wireless communications system 100 comprises a first network node 103 and a second network node 105. As the skilled person will realize, the term "network node" may correspond to any type of radio network node or any network node which communicates with at least a radio network node. For example, the first network node 103 and the second network node 105 may be a radio base station. The radio base station may also be referred to as a NodeB, an evolved Node B (eNB, eNodeB), a base transceiver station (BTS), Access Point (AP) Base Station, Wi-Fi AP, base station router, or any other network unit capable of communicating with a wireless communication within a coverage area, cell or radio beam (not illustrated in FIGS. 1a and 1b) served or maintained by a base station.

In embodiments herein the first network node 103 and the second network node 105 are configured to communicate with and thereby serve wireless communication devices, such as a wireless communication device 101, also referred to as a user equipment (UE) herein. The wireless communication device 101 may, e.g., be in the form of a mobile terminal or a wireless terminal, a mobile phone, a smartphone, a computer such as a laptop, a Personal Digital Assistant (PDA) or a tablet computer, with wireless capability, target device, device to device UE, machine type communication (MTC) UE, Laptop Embedded Equipment (LEE), Laptop Mounted Equipment (LME), universal serial bus (USB) dongles etc. or any other radio network units capable to communicate over a radio link in a wireless communications system. It is to be noted that the term user equipment used in this disclosure also covers other wireless devices such as Machine to machine (M2M) devices and any type of Internet-of-things (IoT) device, even though they are typically not directly operated by a user.

FIG. 1a illustrates an exemplifying scenario in the wireless communication system 100 where only the first network node 103 communicates with the wireless communication device 101. Specifically, a first OFDM signal 111 and a second OFDM signal 112 are transmitted by the first network node 103 to the wireless communication device 101.

FIG. 1b illustrates an exemplifying scenario in the wireless communication system 100 where the first network node 103 communicates with the wireless communication device 101 by transmitting a first OFDM signal 111 to the wireless communication device 101 and the second network node 105 communicates with the wireless communication device 101 by transmitting a second OFDM signal 112 to the wireless communication device 101.

Figure 2A:
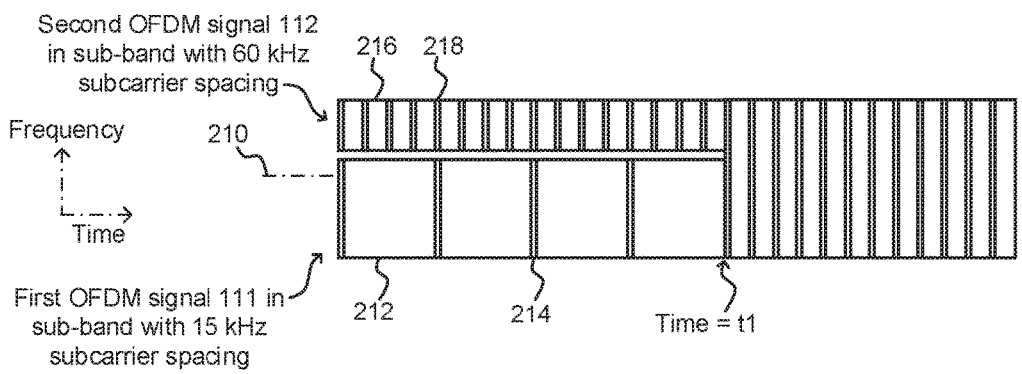
FIGS. 2a and 2b schematically illustrate mixed OFDM subcarrier scenarios.

FIG. 2a illustrates schematically, in a time-frequency diagram, an example of how symbols 212 of the first OFDM signal 111 and symbols 216 of the second OFDM signal 112 may be represented when transmitted by the first network node 103 as illustrated in FIG. 1a. Respective cyclic prefixes (CP) are indicated with reference numerals 214 and 218. As indicated in FIG. 2a, the first and second OFDM signals may be merged in the baseband (time synced) and jointly modulated to a radio frequency (RF) carrier 210. That is, during the transmission, i.e. until a point in time t1, they share carrier frequency 210 (frequency synced). Subsequent to time t1, only the second OFDM signal 112 is transmitted on the carrier frequency 210. Due to the different numerologies, one OFDM symbol 212 of the first OFDM signal 111 is a multiple ×4 longer than an OFDM symbol 216 of the second OFDM signal 112. However, since they are originating from the same node 103, they are synchronized such that samples of the symbols 212, 216 are output in coordination.

Figure 2B:
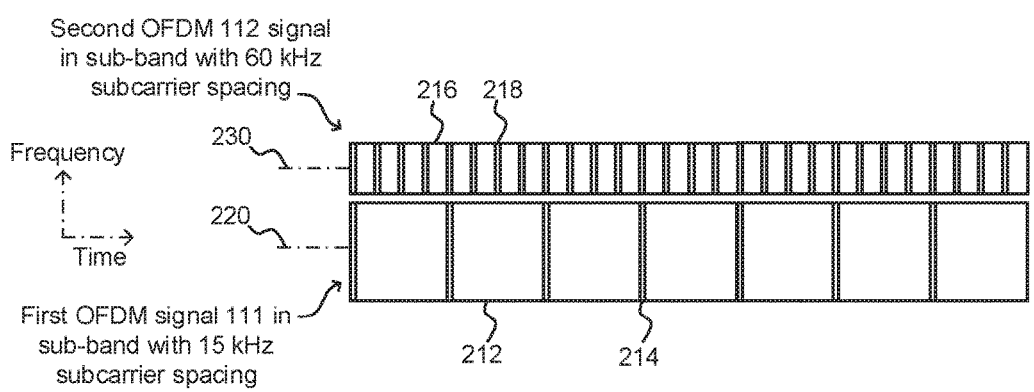

Similarly, FIG. 2b illustrates schematically, in a time-frequency diagram, an example of how symbols 212 of the first OFDM signal 111 and symbols 216 of the second OFDM signal 112 may be represented when transmitted by the first network node 103 and the second network node 105, respectively, as illustrated in FIG. 1b. As indicated in FIG. 2b, the first and second OFDM signals are constructed and modulated to RF carriers separately and thus have their own carrier frequencies and slightly different time offsets. Here it can be noted that although the time offset is perfectly aligned at transmission (as FIG. 2b shows), different distances to the wireless communication device 101 from the first network node 103 and the second network node 105, respectively, will offset the OFDM signals 111, 112 at reception by the wireless communication device 101. In contrast to the scenario in FIG. 2a, the carrier frequencies will differ such that the first OFDM signal 111 has a carrier frequency 220 and the second OFDM signal 112 has a carrier frequency 230.

Turning now to FIGS. 3a-e and with continued reference to FIGS. 1a-b and 2a-b, embodiments of a method that is performed by a wireless communication device 101 in an OFDM wireless communication system 100 will be described in some detail. The method is for determining a first offset parameter and a second offset parameter associated with a respective first OFDM signal 111 and a second OFDM signal 112 having a respective first and second subcarrier frequency spacing. The embodiments of the method will be described in terms of a number of actions as illustrated by the flowcharts in FIGS. 3a-e.

Action 302

The first OFDM signal 111 and the second OFDM signal 112 are received by the wireless communication device 101.

Action 304

A determination is made of whether the transmission of the first OFDM signal 111 is coordinated with transmission of the second OFDM signal 112.

For example, in some embodiments, this determination whether transmission of the first OFDM signal 111 is coordinated with transmission of the second OFDM signal 112 may comprise determining that transmission of the first OFDM signal 111 and the second OFDM signal 112 is controlled by one and the same node in the wireless communication network 100. By being controlled by one and the same network node, the two OFDM signals 111, 112 are coordinated in that one and the same timing reference is typically used in a network node.

This determination may, in some embodiments, comprise receiving a configuration message transmitted from a node with which the wireless communication device 101 is associated in the wireless communication system 100.

In various other embodiments the determination that transmission of the first OFDM signal 111 and the second OFDM signal 112 is controlled by one and the same node may comprise any of:

analysing synchronization signals comprised in at least one of the first and second OFDM signals 111, 112, analysing cell identity information comprised in at least one of the first and second OFDM signals 111, 112, analysing beam identity information comprised in at least one of the first and second OFDM signals 111, 112, and analysing access point identity information comprised in at least one of the first and second OFDM signals 111, 112.

In other words, in case any of the synchronization signals and identity information is transmitted only in one of the first or second OFDM signal 111, 112, the wireless communication device 101 implicitly knows that the first and second OFDM signals 111, 112 are coordinated.

The determination, in action 304, of whether transmission of the first OFDM signal 111 is coordinated with transmission of the second OFDM signal 112 may in some embodiments comprises receiving a message, the message comprising information that specifies that transmission of the first OFDM signal 111 is coordinated with transmission of the second OFDM signal 112. For example, this received message may be a broadcast message transmitted in the wireless communication system 100.

Action 306

A check is made such that if it is determined, in action 304, that the transmission of the first OFDM signal 111 is coordinated with transmission of the second OFDM signal 112, then the method continues with action 308. If not, then the method may return to action 302.

Action 308

A determination is made of the first offset parameter based on the first OFDM signal 111.

Action 310

A determination is made of the second offset parameter based on the first offset parameter.

Figure 3A:
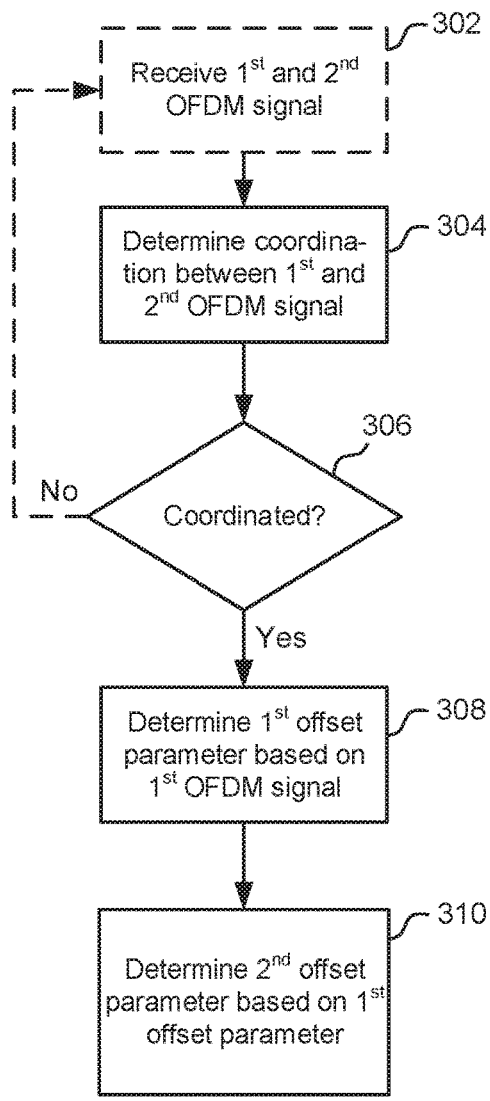
FIGS. 3a-e are flowcharts of methods.
Figure 3B:
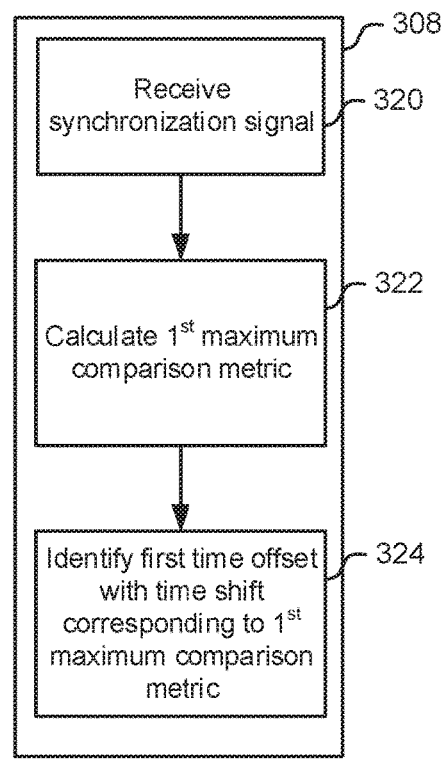

As illustrated in FIG. 3b, in some embodiments, the first offset parameter is a first time-offset and the second offset parameter is a second time-offset. In these embodiments, the determining of the first time-offset in action 308 may comprise a number of actions as follows:

Action 320

A synchronization signal is received.

Action 322

A calculation is made of a first maximum comparison metric. This calculation is done by correlating data of a first plurality of time-shifted versions of the synchronization signal with a known synchronization data sequence.

Action 324

The first time-offset is then identified with a time-shift that corresponds to the first maximum comparison metric.

Figure 3C:
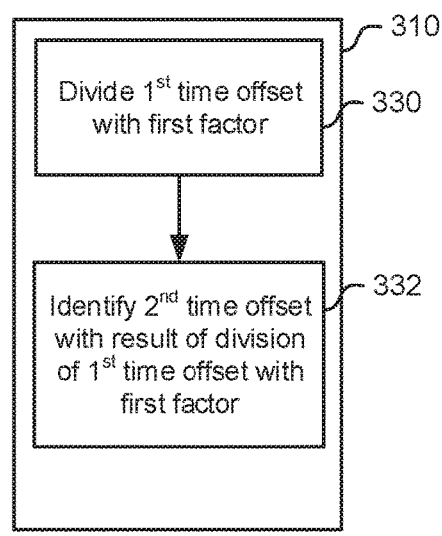

As illustrated in FIG. 3c, in some embodiments, the first subcarrier spacing may be a first factor greater than the second subcarrier spacing. In such embodiments, the determination, in action 310, of the second time-offset based on the first time-offset comprises a number of actions as follows:

Action 330

The first time offset is divided by the first factor.

For example, denoting the first and second subcarrier spacing $c_0$ and $c_1$ for the first and the second OFDM signal 111, 112 respectively, then the second time offset, denoted $\Delta s_1$, may be expressed as $\Delta s_1 = \Delta s_0 * c_1/c_0$, where $\Delta s_0$ is the first time offset.

Action 332

The second time-offset is then identified with the result of the division of the first time offset by the first factor.

In other words, these actions (330 and 332) can be seen as embodiments where the first time offset is down sampled. For example, assuming that the first subcarrier frequency spacing is 60 kHz and the second subcarrier frequency spacing is 15 kHz; then the first time-offset is determined in the correlation procedure (action 322) using a "60 kHz raster" (i.e. sample period) that is suitable for a 60 kHz subcarrier spacing. The time-offset corresponding to the 15 kHz subcarrier spacing is then obtained as the time sample, in a "15 kHz raster" that is wider than the "60 kHz raster", that is as close as possible to the time-offset obtained in the correlation procedure that produced the first time-offset.

In order to obtain such a result, i.e. the second time-offset being as close as possible to the time-offset obtained in the correlation procedure, the division, in action 332, may include a rounding function. However, a simple bit-shifting may also be applied, which is very efficient in terms of use of processing power.

Figure 3D:
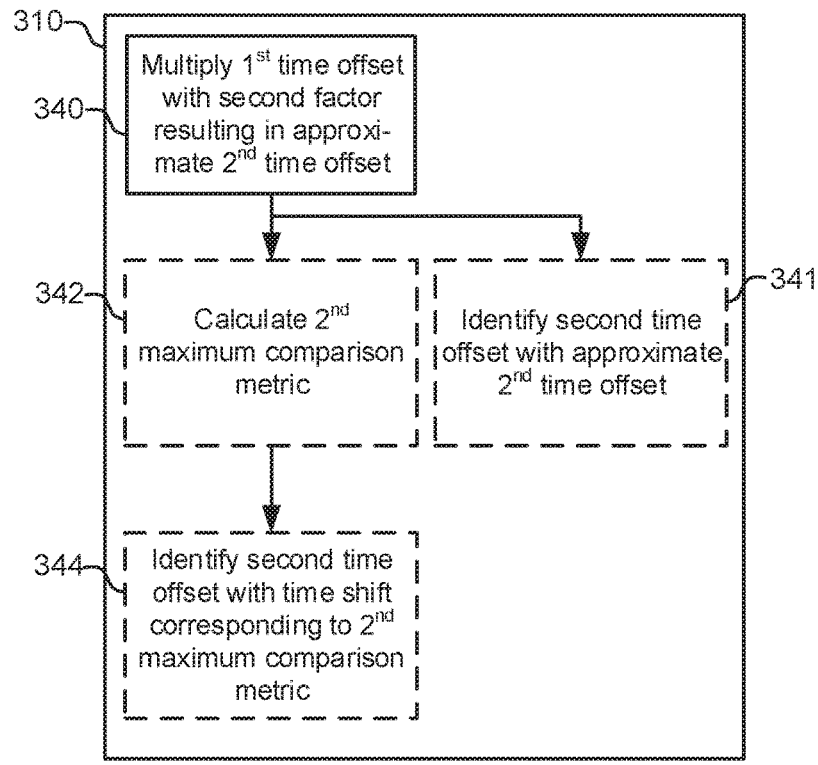

As illustrated in FIG. 3d, in some embodiments, the first subcarrier spacing is a second factor smaller than the second subcarrier spacing. In such embodiments, the determination in action 310 of the second time-offset based on the first time-offset may comprise a number of actions as follows:

Action 340

The first time offset is multiplied by the second factor, resulting in an approximate second time offset.

Action 341

In some embodiments, the approximate second time offset that was achieved by the multiplication in action 340 may then be used directly, i.e. the second time offset may in these embodiments be identified with the approximate second time offset.

Action 342

Instead of using the approximate second time offset directly, as indicated by action 341, in some embodiments a calculation is made of a second maximum comparison metric by correlating data of a second plurality of time-shifted versions of the synchronization signal with a known synchronization data sequence. This second plurality of time-shifted versions of the synchronization signal is smaller than the first plurality of time-shifted versions of the synchronization signal and this second plurality of time shifted versions of the synchronization signal comprises the approximate second time offset (that is calculated by the multiplication in action 340).

Action 344

The second time-offset is then identified with a time-shift that corresponds to the second maximum comparison metric calculated in action 342.

In other words, these actions (340 to 344) describe embodiments where the first time-offset is multiplied and the result of the multiplication is considered as an approximation of the second time-offset. The accuracy of this approximation may then be improved by using it, e.g. as a starting point, in a correlation procedure similar to the correlation procedure that produced the first time-offset.

Figure 3E:
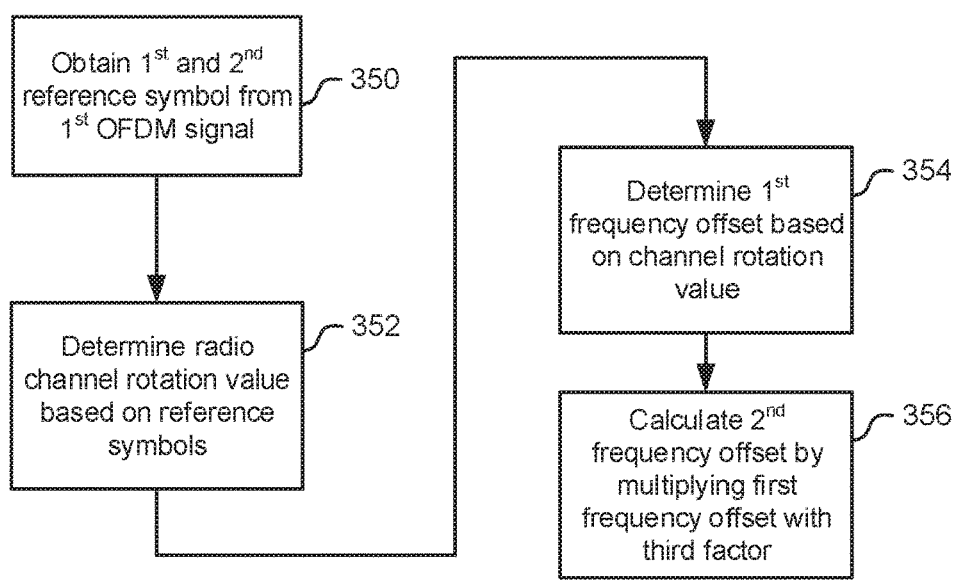

As illustrated in FIG. 3e, in some embodiments, the first offset parameter is a first frequency-offset and the second offset parameter is a second frequency-offset. These embodiments may comprise a number of actions as follows:

Action 350

A first reference symbol and a second reference symbol is obtained from the first OFDM signal 111.

Action 352

A determination is made of a radio channel rotation value, based on the first reference symbol and based on the second reference symbol.

Action 354

A determination is made of the first frequency-offset based on the radio channel rotation value.

For example, these actions 352 and 354 may entail multiplying the first reference symbol, received at a point in time t, with the complex conjugate of the second reference symbol, received at a point in time $\tau$ later, i.e. at $t+\tau$, resulting in a complex value D. The first frequency-offset is then proportional to the channel rotation value, which is simply the angle of D.

Action 356

A calculation is made of the second frequency offset by multiplying the first frequency offset with a third factor. This third factor is the quotient between a carrier frequency of the second OFDM signal 112 and a carrier frequency of the first OFDM signal 111.

For example, denoting the first and second carrier frequency $f_0$ and $f_1$ for the first and the second OFDM signal 111, 112 respectively, then the second frequency offset, denoted $\Delta f_1$, may be expressed as $\Delta f_1 = \Delta f_0 * f_1/f_0$, where $\Delta f_0$ is the first frequency offset.

Figure 4:
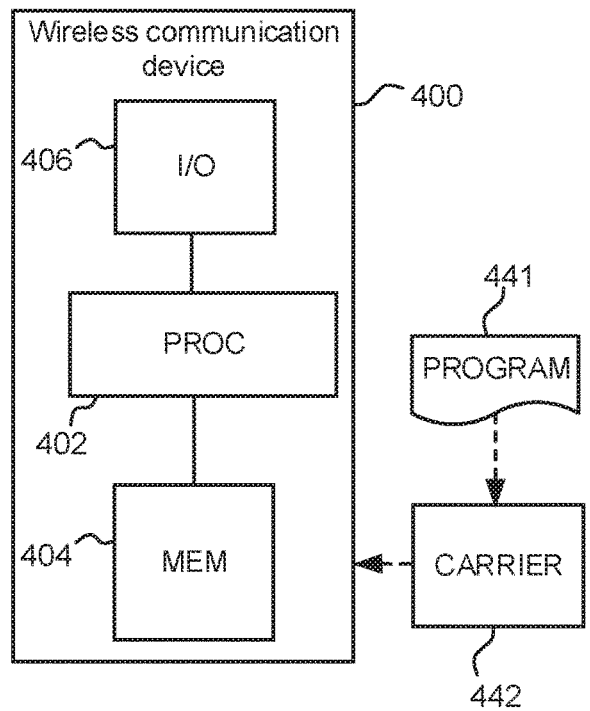
FIG. 4 schematically illustrates a wireless communication device.

Turning now to FIG. 4 and with continued reference to FIGS. 1 and 2, a wireless communication device 400 will be described in some more detail. The wireless communication device 400, which may correspond to the wireless communication device 101 in FIG. 1, is for an OFDM, wireless communication system 100 for determining a first offset parameter and a second offset parameter associated with a respective received first OFDM signal 111 and a second OFDM signal 112 having a respective first and second subcarrier frequency spacing. The wireless communication device 400 comprises input/output circuitry 406, a processor 402 and a memory 404. The memory 404 contains instructions executable by the processor 402 whereby the wireless communication device 400 is operative to:

determine whether transmission of the first OFDM signal 111 is coordinated with transmission of the second OFDM signal 112, if it is determined that the transmission of the first OFDM signal 111 is coordinated with transmission of the second OFDM signal 112, then determine the first offset parameter based on the first OFDM signal 111, and determine the second offset parameter based on the first offset parameter.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the wireless communication device 400 is operative such that the first offset parameter is a first time-offset, the second offset parameter is a second time-offset. In these embodiments, the wireless communication device 400 is operative such that the determining of the first time-offset comprises:

receiving a synchronization signal, calculating a first maximum comparison metric by correlating data of a first plurality of time-shifted versions of the synchronization signal with a known synchronization data sequence, and identifying the first time-offset with a time-shift that corresponds to the first maximum comparison metric.

In some embodiments, the wireless communication device 400 is operative such that the first subcarrier spacing is a first factor greater than the second subcarrier spacing, and operative such that the determination of the second time-offset based on the first time-offset comprises:

dividing the first time offset by the first factor, and identifying the second time-offset with the result of the division of the first time offset by the first factor.

In some embodiments, the wireless communication device 400 is operative such that the first subcarrier spacing is a second factor smaller than the second subcarrier spacing, and operative such that the determination of the second time-offset based on the first time-offset comprises:

multiplying the first time offset by the second factor, resulting in an approximate second time offset, and identifying the second time offset with the approximate second time offset.

In some embodiments, the wireless communication device 400 is operative such that the first subcarrier spacing is a second factor smaller than the second subcarrier spacing, and operative such that the determination of the second time-offset based on the first time-offset comprises:

multiplying the first time offset by the second factor, resulting in an approximate second time offset, calculating a second maximum comparison metric by correlating data of a second plurality of time-shifted versions of the synchronization signal with a known synchronization data sequence, said second plurality of time-shifted versions of the synchronization signal being smaller than said first plurality of time-shifted versions of the synchronization signal and where said second plurality of time shifted versions of the synchronization signal comprises the approximate second time offset, and identifying the second time-offset with a time-shift that corresponds to the second maximum comparison metric.

In some embodiments, the wireless communication device 400 is operative such that the first offset parameter is a first frequency-offset and the second offset parameter is a second frequency-offset, and operative to:

obtaining, from the first OFDM signal 111, a first reference symbol and a second reference symbol, determine, based on the first reference symbol and based on the second reference symbol, a radio channel rotation value, determine the first frequency-offset based on the radio channel rotation value, and calculate the second frequency offset by multiplying the first frequency offset with a third factor, said third factor being the quotient between a carrier frequency of the second OFDM signal 112 and a carrier frequency of the first OFDM signal 111.

In some embodiments, the wireless communication device 400 is operative such that the determining whether transmission of the first OFDM signal 111 is coordinated with transmission of the second OFDM signal 112 comprises:

determining that transmission of the first OFDM signal 111 and the second OFDM signal 112 is controlled by one and the same node in the wireless communication system 100.

In some embodiments, the wireless communication device 400 is operative such that the determination that transmission of the first OFDM signal 111 and the second OFDM signal 112 is controlled by one and the same node in the wireless communication system 100 comprises:

receiving a configuration message transmitted from a node with which the wireless communication device 101 is associated in the wireless communication system 100.

In some embodiments, the wireless communication device 400 is operative such that the determination that transmission of the first OFDM signal 111 and the second OFDM signal 112 is controlled by one and the same node in the wireless communication system 100 comprises any of:

- analysing synchronization signals comprised in at least one of the first and second OFDM signals 111, 112,
- analysing cell identity information comprised in at least one of the first and second OFDM signals 111, 112,
- analysing beam identity information comprised in at least one of the first and second OFDM signals 111, 112,
- analysing access point identity information comprised in at least one of the first and second OFDM signals 111, 112.

In some embodiments, the wireless communication device 400 is operative such that the determining whether transmission of the first OFDM signal 111 is coordinated with transmission of the second OFDM signal 112 comprises:

- receiving a message, said message comprising information that specifies that transmission of the first OFDM signal 111 is coordinated with transmission of the second OFDM signal 112.

In some embodiments, the wireless communication device 400 is operative such that the received message is a broadcast message transmitted in the wireless communication system 100.

Figure 5:
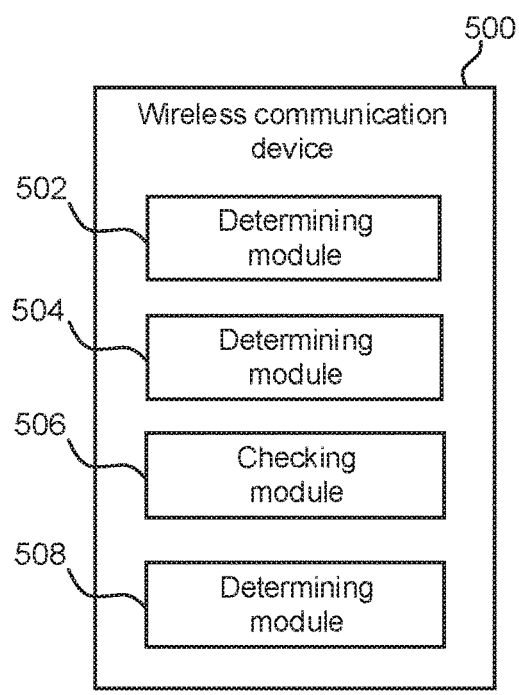
FIG. 5 schematically illustrates a wireless communication device.

Turning now to FIG. 5 and with continued reference to FIGS. 1 and 2, a wireless communication device 500 will be described in some more detail. The wireless communication device 500, which may correspond to the wireless communication device 101 in FIG. 1, is for an OFDM, wireless communication system 100 for determining a first offset parameter and a second offset parameter associated with a respective received first OFDM signal 111 and second OFDM signal 112 having a respective first and second subcarrier frequency spacing. The wireless communication device 500 comprises:

- a determining module 502 configured to determine whether transmission of the first OFDM signal 111 is coordinated with transmission of the second OFDM signal 112,
- a checking module 504 configured to check if it is determined that the transmission of the first OFDM signal 111 is coordinated with transmission of the second OFDM signal 112,
- a determining module 506 configured to determine the first offset parameter based on the first OFDM signal 111, and
- a determining module 508 configured to determine the second offset parameter based on the first offset parameter.

The wireless communication device 500 may comprise further modules that are configured to perform in a similar manner as, e.g., the wireless communication device 400 described above in connection with FIG. 4.

The invention claimed is:

1. A method performed by a wireless communication device in an orthogonal frequency-division multiplexing, OFDM, wireless communication system for determining a first offset parameter and a second offset parameter associated with a respective received first OFDM signal and a second OFDM signal having a respective first and second subcarrier frequency spacing, wherein the first and second subcarrier frequency spacings are different from one another, the method comprising:

- determining whether or not transmission of the first OFDM signal is made from a same wireless communication system node as transmission of the second OFDM signal,
- if it is determined that the transmission of the first OFDM signal is made from the same wireless communication system node as transmission of the second OFDM signal, then
  - determining the first offset parameter based on the first OFDM signal, and
  - determining the second offset parameter based on the first offset parameter,
- wherein determining the second offset parameter based on the first offset parameter comprises converting a value of the first offset parameter by a factor that is one of:
  - a relationship between the first subcarrier frequency spacing and the second subcarrier frequency spacing; and
  - a relationship between a frequency of the first OFDM signal and a frequency of the second OFDM signal.

2. The method of claim 1, where the first offset parameter is a first time-offset, the second offset parameter is a second time-offset, and where the determining of the first time-offset comprises:

- receiving a synchronization signal,
- calculating a first maximum comparison metric by correlating data of a first plurality of time-shifted versions of the synchronization signal with a known synchronization data sequence, and
- identifying the first time-offset with a time-shift that corresponds to the first maximum comparison metric.

3. The method of claim 2, where the first subcarrier spacing is a first factor greater than the second subcarrier spacing, and where the determination of the second time-offset based on the first time-offset comprises:

- dividing the first time offset by the first factor, and
- identifying the second time-offset with the result of the division of the first time offset by the first factor.

4. The method of claim 2, where the first subcarrier spacing is a second factor smaller than the second subcarrier spacing, and where the determination of the second time-offset based on the first time-offset comprises:

- multiplying the first time offset by the second factor, resulting in an approximate second time offset, and
- identifying the second time offset with the approximate second time offset.

5. The method of claim 2, where the first subcarrier spacing is a second factor smaller than the second subcarrier spacing, and where the determination of the second time-offset based on the first time-offset comprises:

- multiplying the first time offset by the second factor, resulting in an approximate second time offset,
- calculating a second maximum comparison metric by correlating data of a second plurality of time-shifted versions of the synchronization signal with a known synchronization data sequence, said second plurality of time-shifted versions of the synchronization signal being smaller than said first plurality of time-shifted versions of the synchronization signal and where said second plurality of time shifted versions of the synchronization signal comprises the approximate second time offset, and
- identifying the second time-offset with a time-shift that corresponds to the second maximum comparison metric.

6. The method of claim 1, where the first offset parameter is a first frequency-offset and the second offset parameter is a second frequency-offset, comprising:

- obtaining, from the first OFDM signal, a first reference symbol and a second reference symbol, determining, based on the first reference symbol and based on the second reference symbol, a radio channel rotation value,
determining the first frequency-offset based on the radio channel rotation value, and
calculating the second frequency offset by multiplying the first frequency offset with a third factor, said third factor being the quotient between a carrier frequency of the second OFDM signal and a carrier frequency of the first OFDM signal.

7. The method of claim 1, wherein the determining whether transmission of the first OFDM signal is made from the same wireless communication system node as transmission of the second OFDM signal comprises:
determining that transmission of the first OFDM signal and the second OFDM signal is controlled by one and the same node in the wireless communication system.

8. The method of claim 7, wherein the determination that transmission of the first OFDM signal and the second OFDM signal is controlled by one and the same node in the wireless communication system comprises:
receiving a configuration message transmitted from a node with which the wireless communication device is associated in the wireless communication system.

9. The method of claim 7, wherein the determination that transmission of the first OFDM signal and the second OFDM signal is controlled by one and the same node in the wireless communication system comprises any of:
analyzing synchronization signals comprised in at least one of the first and second OFDM signals,
analyzing cell identity information comprised in at least one of the first and second OFDM signals,
analyzing beam identity information comprised in at least one of the first and second OFDM signals,
analyzing access point identity information comprised in at least one of the first and second OFDM signals.

10. The method of claim 1, wherein the determining whether transmission of the first OFDM signal is made from the same wireless communication system node as transmission of the second OFDM signal comprises:
receiving a message, said message comprising information that specifies that transmission of the first OFDM signal is coordinated with transmission of the second OFDM signal.

11. The method of claim 10, wherein the received message is a broadcast message transmitted in the wireless communication system.

12. A wireless communication device for an orthogonal frequency-division multiplexing, OFDM, wireless communication system for determining a first offset parameter and a second offset parameter associated with a respective received first OFDM signal and a second OFDM signal having a respective first and second subcarrier frequency spacing, wherein the first and second subcarrier frequency spacings are different from one another, the wireless communication device comprising input/output circuitry, a processor and a memory, said memory containing instructions executable by said processor whereby said wireless communication device is operative to:
determine whether or not transmission of the first OFDM signal is made from a same wireless communication system node as transmission of the second OFDM signal,
if it is determined that the transmission of the first OFDM signal is made from the same wireless communication system node as transmission of the second OFDM signal, then
determine the first offset parameter based on the first OFDM signal, and
determine the second offset parameter based on the first offset parameter,
wherein determining the second offset parameter based on the first offset parameter comprises converting a value of the first offset parameter by a factor that is one of:
a relationship between the first subcarrier frequency spacing and the second subcarrier frequency spacing; and
a relationship between a frequency of the first OFDM signal and a frequency of the second OFDM signal.

13. The wireless communication device of claim 12, operative such that the first offset parameter is a first time-offset, the second offset parameter is a second time-offset, and operative such that the determining of the first time-offset comprises:
receiving a synchronization signal,
calculating a first maximum comparison metric by correlating data of a first plurality of time-shifted versions of the synchronization signal with a known synchronization data sequence, and
identifying the first time-offset with a time-shift that corresponds to the first maximum comparison metric.

14. The wireless communication device of claim 13, operative such that the first subcarrier spacing is a first factor greater than the second subcarrier spacing, and operative such that the determination of the second time-offset based on the first time-offset comprises:
dividing the first time offset by the first factor, and
identifying the second time-offset with the result of the division of the first time offset by the first factor.

15. The wireless communication device of claim 13, operative such that the first subcarrier spacing is a second factor smaller than the second subcarrier spacing, and operative such that the determination of the second time-offset based on the first time-offset comprises:
multiplying the first time offset by the second factor, resulting in an approximate second time offset, and
identifying the second time offset with the approximate second time offset.

16. The wireless communication device of claim 13, operative such that the first subcarrier spacing is a second factor smaller than the second subcarrier spacing, and operative such that the determination of the second time-offset based on the first time-offset comprises:
multiplying the first time offset by the second factor, resulting in an approximate second time offset,
calculating a second maximum comparison metric by correlating data of a second plurality of time-shifted versions of the synchronization signal with a known synchronization data sequence, said second plurality of time-shifted versions of the synchronization signal being smaller than said first plurality of time-shifted versions of the synchronization signal and where said second plurality of time shifted versions of the synchronization signal comprises the approximate second time offset, and
identifying the second time-offset with a time-shift that corresponds to the second maximum comparison metric.

17. The wireless communication device of claim 12, operative such that the first offset parameter is a first frequency-offset and the second offset parameter is a second frequency-offset, and operative to:
obtain, from the first OFDM signal, a first reference symbol and a second reference symbol, determine, based on the first reference symbol and based on the second reference symbol, a radio channel rotation value, determine the first frequency-offset based on the radio channel rotation value, and calculate the second frequency offset by multiplying the first frequency offset with a third factor, said third factor being the quotient between a carrier frequency of the second OFDM signal and a carrier frequency of the first OFDM signal.

18. The wireless communication device of claim 12, operative such that the determining whether transmission of the first OFDM signal is made from the same wireless communication system node as transmission of the second OFDM signal comprises:

determining that transmission of the first OFDM signal and the second OFDM signal is controlled by one and the same node in the wireless communication system.

19. The wireless communication device of claim 18, operative such that the determination that transmission of the first OFDM signal and the second OFDM signal is controlled by one and the same node in the wireless communication system comprises:

receiving a configuration message transmitted from a node with which the wireless communication device is associated in the wireless communication system.

20. The wireless communication device of claim 18, operative such that the determination that transmission of the first OFDM signal and the second OFDM signal is controlled by one and the same node in the wireless communication system comprises any of:

analyzing synchronization signals comprised in at least one of the first and second OFDM signals, analyzing cell identity information comprised in at least one of the first and second OFDM signals, analyzing beam identity information comprised in at least one of the first and second OFDM signals, analyzing access point identity information comprised in at least one of the first and second OFDM signals.

21. The wireless communication device of claim 12, operative such that the determining whether transmission of the first OFDM signal is made from the same wireless communication system node as transmission of the second OFDM signal comprises:

receiving a message, said message comprising information that specifies that transmission of the first OFDM signal is coordinated with transmission of the second OFDM signal.

22. The wireless communication device of claim 21, operative such that the received message is a broadcast message transmitted in the wireless communication system.

23. A nontransitory computer-readable storage medium comprising a computer program comprising instructions which, when executed on at least one processor in a wireless communication device in an orthogonal frequency-division multiplexing, OFDM, wireless communication system, cause the wireless communication device to carry out a method for determining a first offset parameter and a second offset parameter associated with a respective received first OFDM signal and a second OFDM signal having a respective first and second subcarrier frequency spacing, wherein the first and second subcarrier frequency spacings are different from one another, the method comprising:

determining whether or not transmission of the first OFDM signal is made from a same wireless communication system node as transmission of the second OFDM signal, if it is determined that the transmission of the first OFDM signal is made from the same wireless communication system node as transmission of the second OFDM signal, then determining the first offset parameter based on the first OFDM signal, and determining the second offset parameter based on the first offset parameter, wherein determining the second offset parameter based on the first offset parameter comprises converting a value of the first offset parameter by a factor that is one of:

a relationship between the first subcarrier frequency spacing and the second subcarrier frequency spacing; and a relationship between a frequency of the first OFDM signal and a frequency of the second OFDM signal.

* * * * *